(12) United States Patent
Hirose

(10) Patent No.: US 8,467,074 B2
(45) Date of Patent: Jun. 18, 2013

(54) IMAGE FORMING APPARATUS, METHOD FOR CONTROLLING THE IMAGE FORMING APPARATUS, AND STORAGE MEDIUM

(75) Inventor: Hideki Hirose, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 12/776,270

(22) Filed: May 7, 2010

(65) Prior Publication Data

US 2010/0290069 A1 Nov. 18, 2010

(30) Foreign Application Priority Data

May 12, 2009 (JP) ................................ 2009-115553

(51) Int. Cl.
*G06K 15/00* (2006.01)
(52) U.S. Cl.
USPC .................... 358/1.12; 270/52.01; 270/58.08; 271/298; 271/302
(58) Field of Classification Search
USPC ............. 270/52.01, 58.23; 271/298; 358/1.12
See application file for complete search history.

(56) References Cited

U.S. PATENT DOCUMENTS

| 5,328,169 A * | 7/1994 | Mandel ......................... 271/290 |
| 2003/0123895 A1* | 7/2003 | Ishii ............................... 399/82 |

FOREIGN PATENT DOCUMENTS

JP 2000-155506 A 6/2000

* cited by examiner

*Primary Examiner* — Marivelisse Santiago Cordero
*Assistant Examiner* — Moustapha Diaby
(74) *Attorney, Agent, or Firm* — Canon U.S.A., Inc. IP Division

(57) ABSTRACT

A method for controlling an apparatus, including a plurality of lockable discharge units configured to discharge a printed product having an image formed thereon based on a received job to any one of the plurality of lockable discharge units, includes managing information about a lockable discharge unit to which the printed product is discharged in association with information about a user, notifying the user to prompt picking up the printed product discharged to the lockable discharge unit based on the managed information, and determining whether a particular user is using the plurality of lockable discharge units based on the managed information, wherein, in a case where the particular user is using the plurality of lockable discharge units, the notification is performed.

15 Claims, 12 Drawing Sheets

FIG. 3

| PAPER DISCHARGE TRAY LIST | PAPER STATE OF PAPER DISCHARGE TRAYS | DETECTION OF MAXIMUM DISCHARGED PAPER STACK | LOCK OPENING/ CLOSING | DOOR STATE | USER | USE TIME |
|---|---|---|---|---|---|---|
| ESCAPE TRAY | NONE | NONE | — | — | — | — |
| TRAY 1 | NONE | NONE | LOCKED | CLOSED | — | — |
| TRAY 2 | NONE | NONE | LOCKED | CLOSED | — | — |
| TRAY 3 | NONE | NONE | LOCKED | CLOSED | — | — |
| TRAY 4 | NONE | NONE | LOCKED | CLOSED | — | — |
| TRAY 5 | NONE | NONE | LOCKED | CLOSED | — | — |

FIG. 4

| PAPER DISCHARGE TRAY LIST | PAPER STATE OF PAPER DISCHARGE TRAYS | DETECTION OF MAXIMUM DISCHARGED PAPER STACK | LOCK OPENING/ CLOSING | DOOR STATE | USER | USE TIME |
|---|---|---|---|---|---|---|
| ESCAPE TRAY | NONE | NONE | — | — | — | — |
| TRAY 1 | PAPER PRESENT | MAXIMUM STACK | LOCKED | CLOSED | USER A | 15:30 |
| TRAY 2 | PAPER PRESENT | NONE | LOCKED | CLOSED | USER B | 00:15 |
| TRAY 3 | PAPER PRESENT | NONE | LOCKED | CLOSED | USER C | 01:45 |
| TRAY 4 | PAPER PRESENT | NONE | LOCKED | CLOSED | USER A | 15:30 |
| TRAY 5 | PAPER PRESENT | NONE | LOCKED | CLOSED | USER D | 00:05 |

FIG. 8A
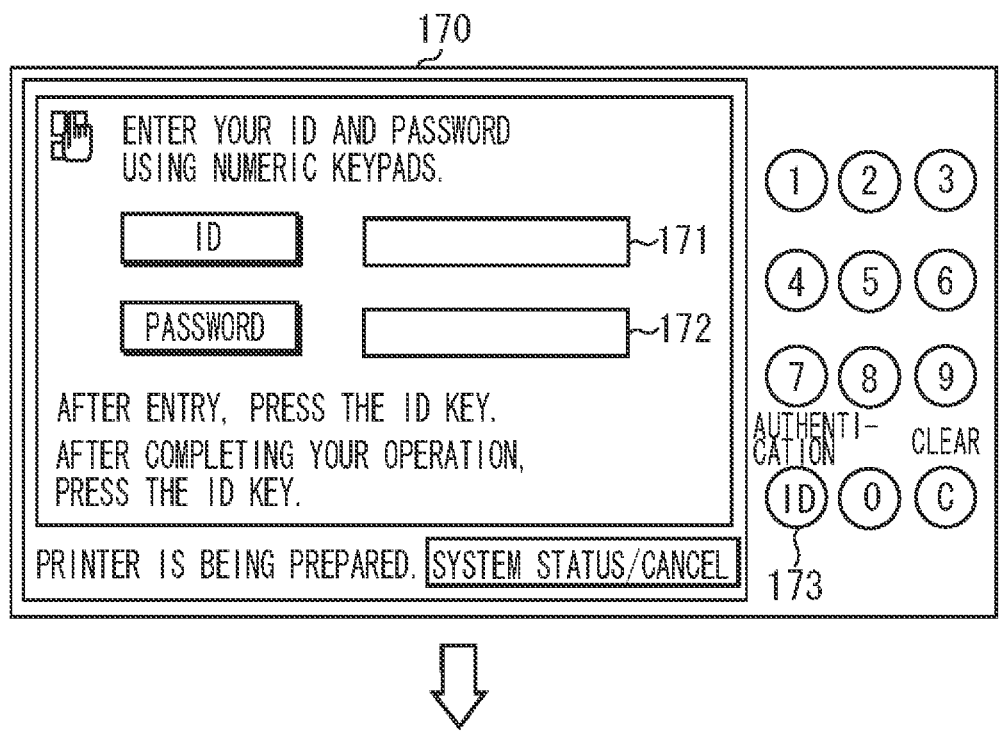
FIG. 8B
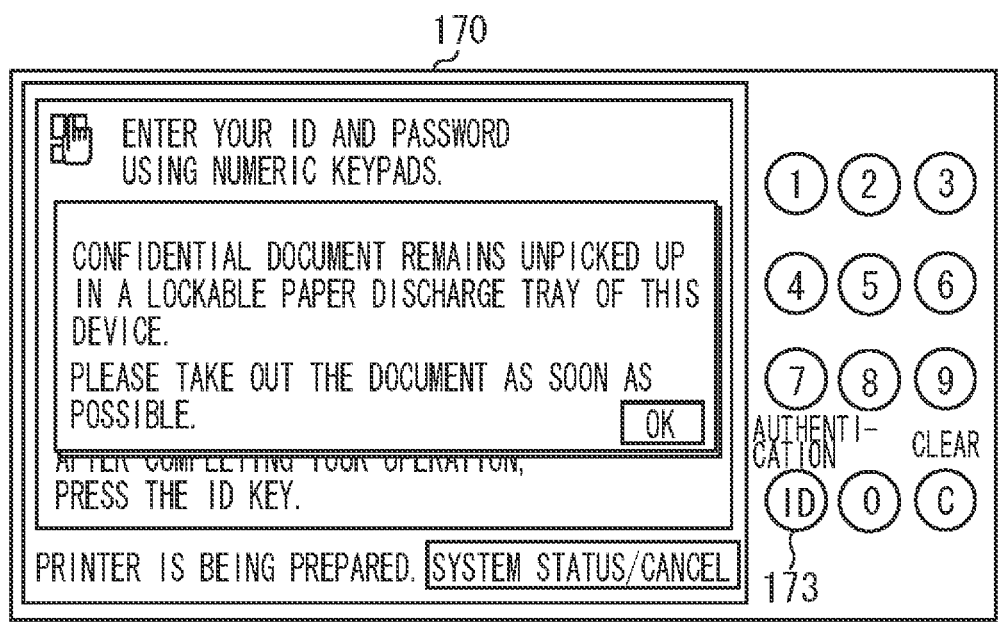

FIG. 10A
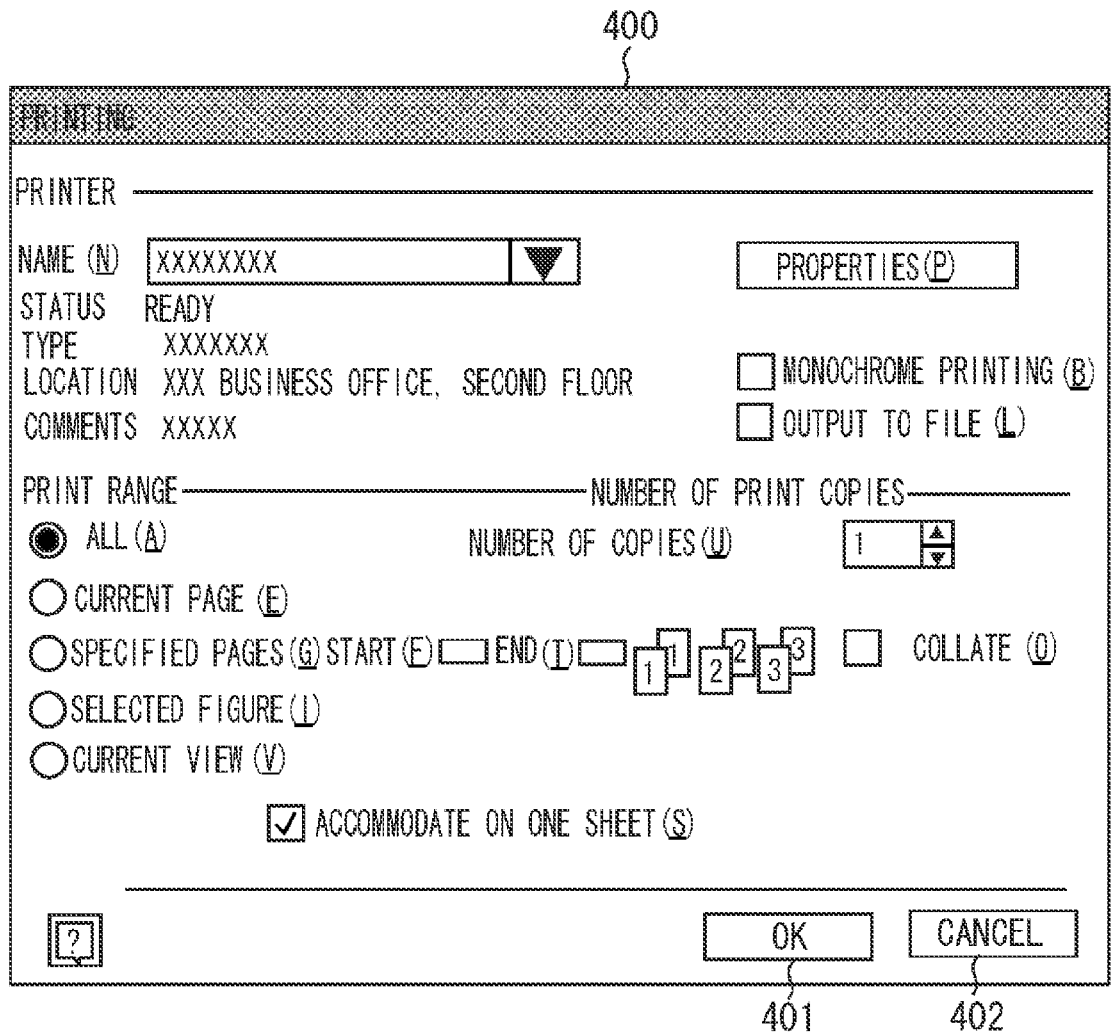

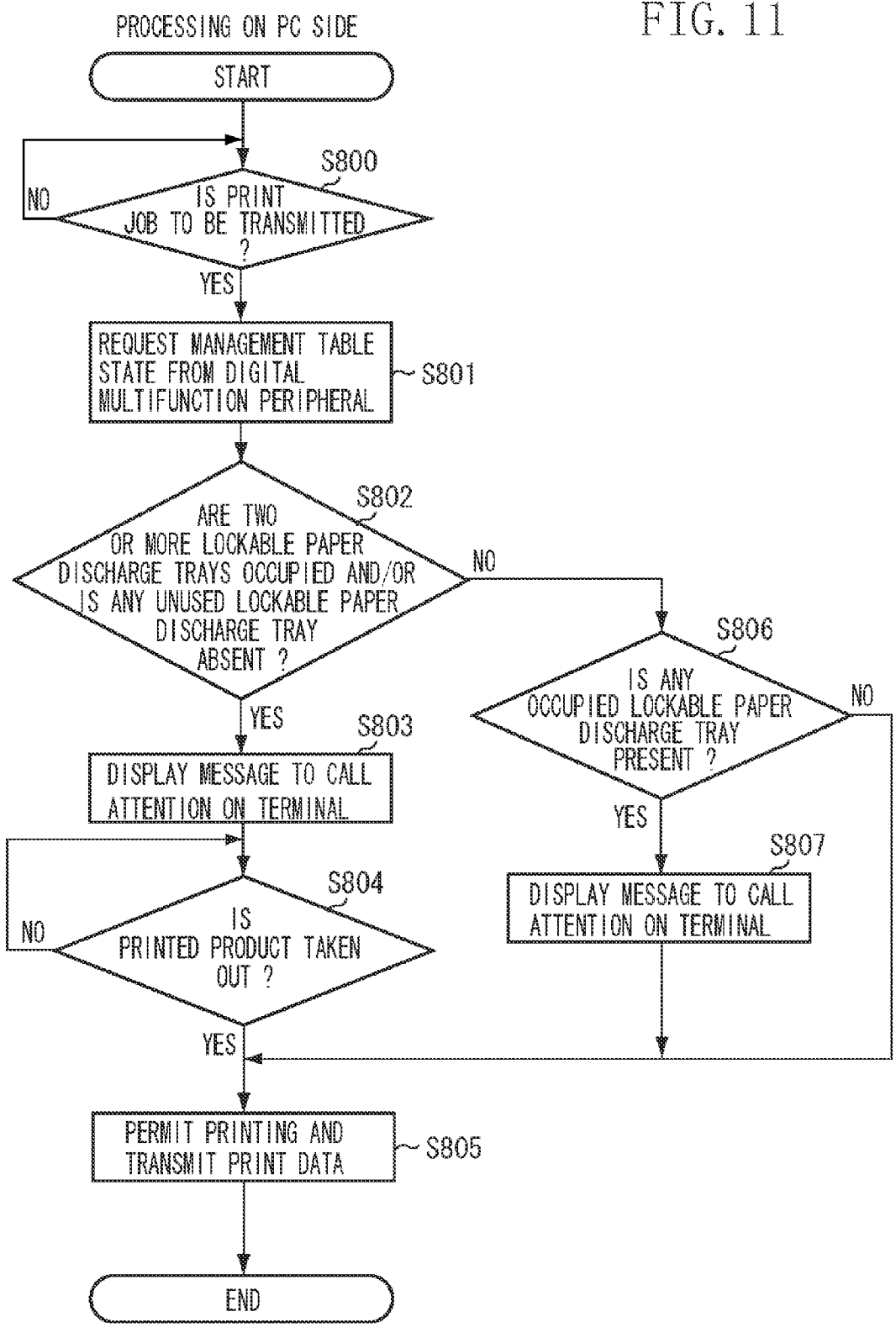

IMAGE FORMING APPARATUS, METHOD FOR CONTROLLING THE IMAGE FORMING APPARATUS, AND STORAGE MEDIUM

BACKGROUND OF THE INVENTION

1. Field of the Invention

The present invention relates to an image forming apparatus, a method for controlling the image forming apparatus, and a storage medium.

2. Description of the Related Art

An image forming apparatus equipped with a lockable discharge unit has been known to maintain confidentiality of a printed product. In such an image forming apparatus, when compared with a secure print system that outputs print data on condition that a password has been input, the user is to only pick up a printed product that has been printed so that the printed product can be obtained quickly.

However, the number of lockable discharge units provided in such an image forming apparatus is limited and thus, the user is to come and pick up a printed product as soon as possible. Japanese Patent Application Laid-Open No. 2000-155506 discusses an image forming apparatus that is capable of notifying the user of a printed product remaining unpicked up in the discharge unit for a predetermined time or longer.

However, in a case where an image forming apparatus equipped with a plurality of lockable discharge units is shared and used by a plurality of users, a single user may cause printed products to be discharged to the plurality of lockable discharge units.

According to a notification method discussed in Japanese Patent Application Laid-Open No. 2000-155506, a notification may be made regardless of whether the user intends to use the image forming apparatus and thus, there are cases where the user does not come to pickup a printed product, which remains unpicked up in the discharge unit. Moreover, a situation in which a single user occupies a plurality of discharge units is not assumed so that it is difficult to deal with such a situation.

SUMMARY OF THE INVENTION

According to an aspect of the present invention, an apparatus, including a plurality of lockable discharge units configured to discharge a printed product having an image formed thereon based on a received job to any one of the plurality of lockable discharge units, includes a management unit configured to manage information about a lockable discharge unit to which the printed product is discharged in association with information about a user, a notification unit configured to notify the user to prompt picking up the printed product discharged to the lockable discharge unit based on the managed information, and a determination unit configured to determine whether a particular user is using the plurality of lockable discharge units based on the managed information, wherein, in a case where the particular user is using the plurality of lockable discharge units, the notification unit notifies the particular user.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a diagram illustrating a management table managed by a paper discharge tray management unit.

FIG. 4 is a diagram illustrating the management table managed by the paper discharge tray management unit.

FIGS. 8A and 8B are diagrams illustrating an operation unit of the image forming apparatus.

FIGS. 10A and 10B are diagrams illustrating a user interface (UI) displayed in a display apparatus.

FIG. 11 is a flow chart illustrating a data processing procedure for an information processing apparatus.

DESCRIPTION OF THE EMBODIMENTS

Various exemplary embodiments, features, and aspects of the invention will be described in detail below with reference to the drawings.

Figure 1:
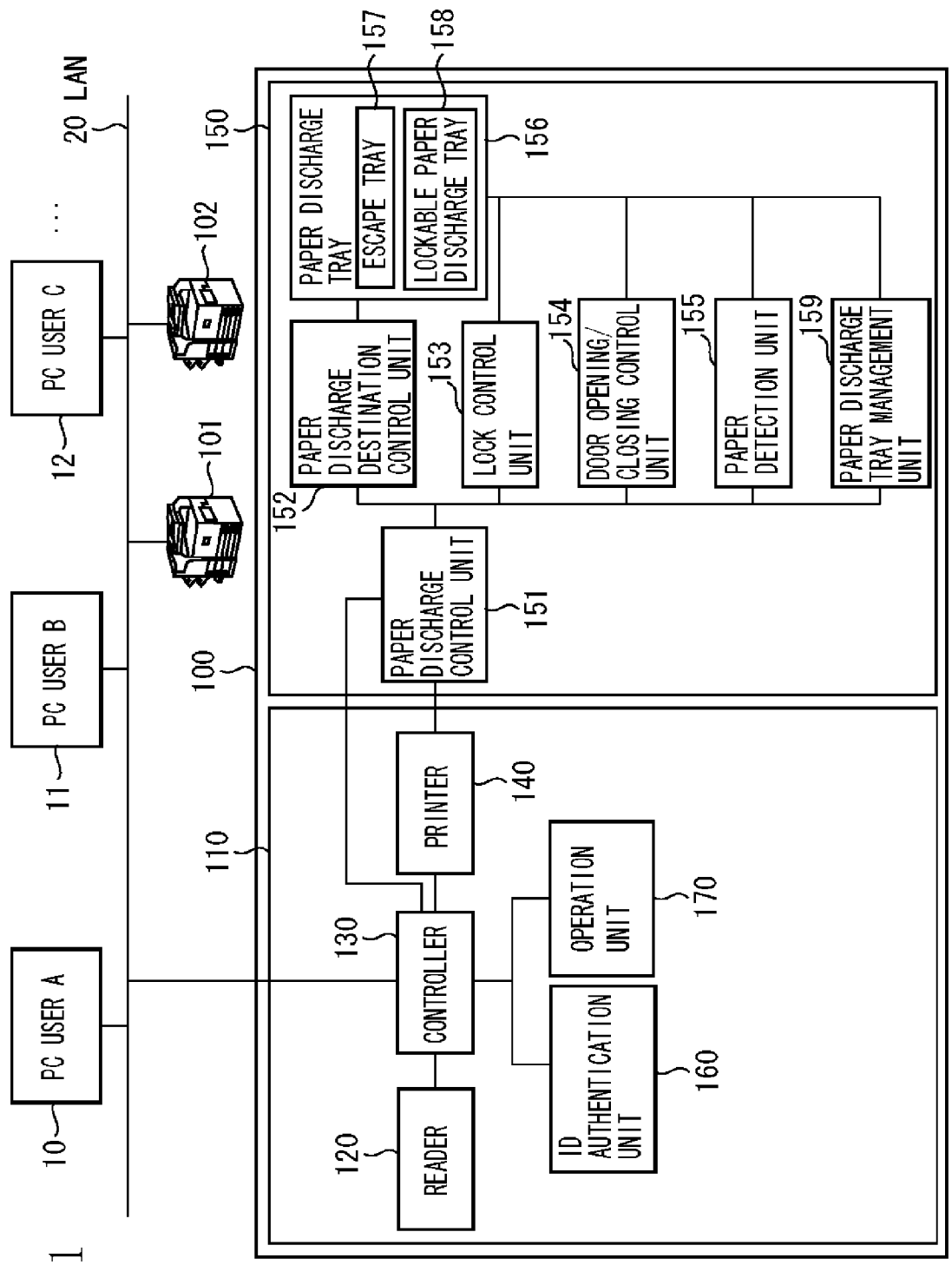
FIG. 1 is a diagram illustrating an example of an image forming system.

FIG. 1 is a diagram illustrating an example of an image forming system according to a first exemplary embodiment of the present invention. The present example is an example of the image forming system in which an image forming apparatus and a personal computer (PC) are connected via a network. It is assumed that the image forming apparatus in the present exemplary embodiment is an image forming apparatus equipped with multiple functions, but may be a printing apparatus executing only a printer function. Moreover, image forming apparatuses 101 and 102 are equipped with hardware resources and software resources like those of an image forming apparatus 100. Further, the image forming apparatus in the present exemplary embodiment is configured to be equipped with a plurality of lockable discharge units. Here, the lockable discharge unit corresponds to a lockable paper discharge tray 158 illustrated in FIG. 1. The number of lockable paper discharge trays is determined by the configuration of the discharge unit and in the present exemplary embodiment, a case where five lockable discharge units are equipped is shown.

In FIG. 1, PCs 10, 11, and 12 are connected to the image forming apparatuses 100, 101, and 102 via a local area network (LAN) 20. The PCs 10, 11, and 12 are used by users A, B, and C, respectively. Three PCs are illustrated in FIG. 1, but the number of PCs is not limited to three. Similarly, three image forming apparatuses are illustrated in FIG. 1, but the number of image forming apparatuses is not limited to three.

The PCs 10, 11, and 12 can transmit/receive data to/from the image forming apparatuses 100, 101, and 102 via the LAN 20 so that data generated by the PCs 10, 11, and 12 can be printed or conditions of the image forming apparatuses 100, 101, and 102 can be checked. The image forming apparatus 100 will be taken below as an example.

The image forming apparatus 100 includes a main body 110 and a discharge unit 150. The main body 110 mainly includes a reader 120 that reads a document image, a controller 130 that controls the whole apparatus, and a printer 140 that does printing on paper. Further, the main body 110 includes an identification (ID) authentication unit 160 that authenticates users and an operation unit 170 that specifies an operation of the image forming apparatus. Incidentally, the operation unit 170 functions also as a display unit that displays a message to pick up printed products discharged to a plurality of lockable discharge units based on control illustrated in a flow chart described below.

Further, the controller 130 includes a network controller to communicate with the PCs 10 and 11 or the image forming apparatuses 101 and 102 via the LAN 20 using a predetermined protocol.

The discharge unit 150 includes a paper discharge control unit 151 to control the whole discharge unit 150, communicate with the controller 130 and the printer 140, and control printed paper. A paper discharge tray 156 includes a lockable paper discharge tray 158, which keeps the discharged paper and is capable of locking the door of the discharge unit 150, and a paper discharge tray (hereinafter, referred to as an escape tray) 157, which has neither a door nor a lock. The paper discharge control unit 151 includes a central processing unit (CPU), read-only memory (ROM), and random access memory (RAM) (not illustrated) and controls the discharge unit 150 using a program stored in the ROM.

A paper discharge destination control unit 152 executes paper discharge control according to the selection of a paper discharge destination of the printed sheets of paper following instructions of the paper discharge control unit 151. A lock control unit 153 controls locking or unlocking of the lockable paper discharge tray 158. When a printed product is discharged to a lockable discharge unit, the lock control unit 153 executes control so that the lockable discharge unit is locked. When the user ID and the password entered via the operation unit 170 to pick up a printed product discharged to a lockable discharge unit are authenticated, the lock control unit 153 unlocks the lockable discharge unit.

A door opening/closing control unit 154 to detect door opening/closing can detect opening/closing of the door of the lockable paper discharge tray 158 and also control opening/closing of the door. Opening/closing of the door may be configured as a mechanical type such as a micro-switch or an electric type using a magnetic switch or the like. A paper detection unit 155 detects the presence/absence of paper in the discharge unit 150 and also checks whether the number of sheets of printed paper exceeds the maximum number of stackable sheets. The paper discharge tray 156 performs control of the door opening/closing state, state monitoring of the locked state, and presence/absence of paper via the lock control unit 153, the door opening/closing control unit 154, and the paper detection unit 155. A paper discharge tray management unit 159 manages to which of the lockable paper discharge trays 158 each user outputs confidential documents to use.

If viewing attribute information of print data received from the PC 10, 11, or 12 reveals that the request is a print request whose security level is high containing confidential information, the paper discharge destination control unit 152 executes control so that a printed product is output to the lockable paper discharge tray 158.

Figure 2:
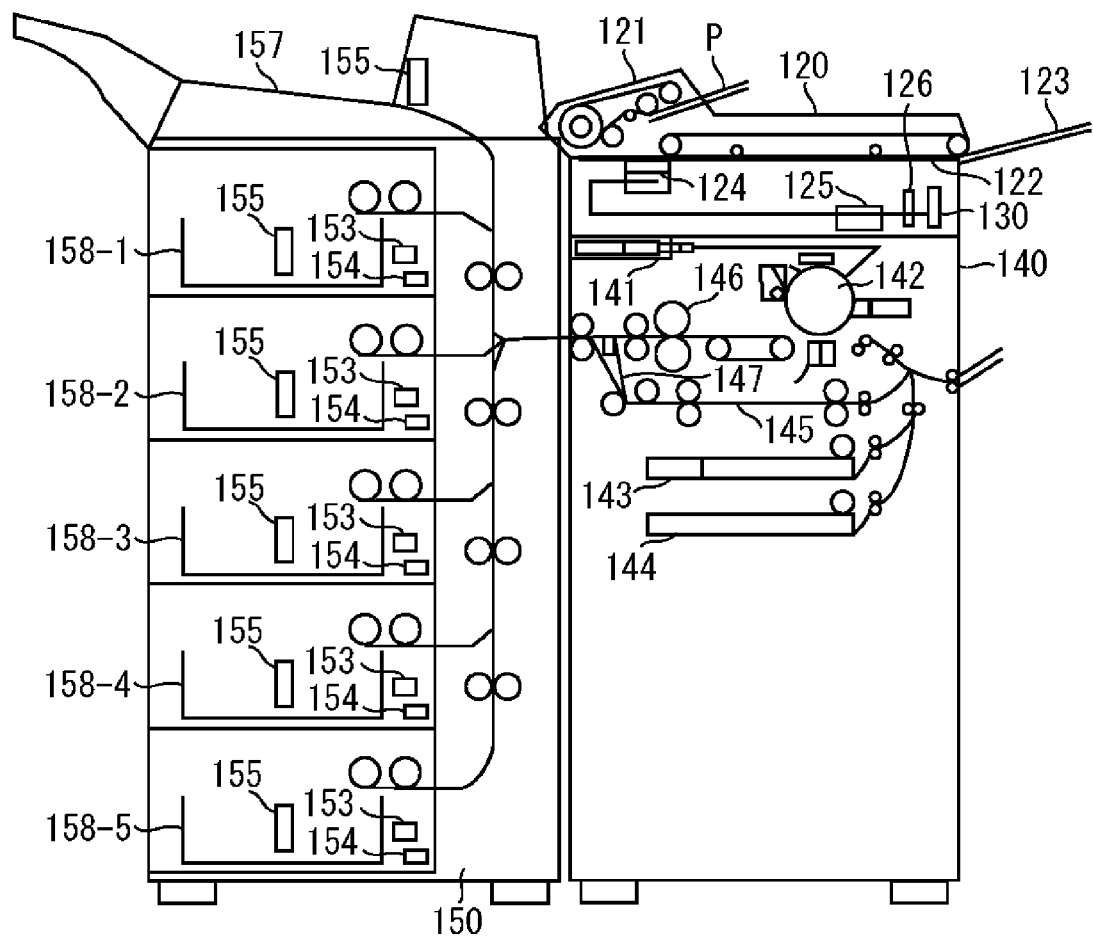
FIG. 2 is a sectional schematic diagram illustrating an internal configuration of an image forming apparatus.

FIG. 2 is a sectional schematic diagram illustrating the internal configuration of the image forming apparatus 100 illustrated in FIG. 1. The image forming apparatus 100 includes, as illustrated in FIG. 2, the reader 120 that reads a document image, the printer 140, and the paper discharge unit 150.

In FIG. 2, the reader 120 has a document feeding apparatus 121 mounted therein. The document feeding apparatus 121 feeds one page at a time from the first page of a document P set to the document tray upward in the left direction in FIG. 2 to convey the page from left to right on a platen glass 122 through a flow reading position after passing through a curved path. Then, the document P is discharged toward an outside paper discharge tray 123. When the document P passes through the flow reading position on the platen glass 122 from left to right, a document image thereof is read by a scanner unit 124 held at a position corresponding to the flow reading position.

When a document passes through the flow reading position, the reading surface of the document is irradiated with light of a lamp of the scanner unit 124, and reflected light from the document is led to a lens 125 via a mirror. After passing through the lens 125, the light forms an image on an imaging plane of an image sensor 126.

By conveying a document to pass through the flow reading position from left to right, as described above, a document reading scan is performed. The whole document image is read by the image sensor 126 and the optically read image is converted into image data by the image sensor 126 before being output. The image data output from the image sensor 126, after predetermined image processing being performed thereon by the controller 130, is input into an exposure control unit 141 of the printer 140 as a video signal. Here, the predetermined image processing includes shading correction processing.

Incidentally, it is also possible to read a document by causing the document to stop at a predetermined position after being conveyed onto the platen glass 122 by the document feeding apparatus 121 and causing the scanner unit 124 to scan in this state from left to right in FIG. 2.

The exposure control unit 141 of the printer 140 modulates laser light based on an input video signal and outputs the laser light, which is emitted onto a photosensitive drum 142 while being scanned by a polygon mirror or the like. An electrostatic latent image according to the scanned laser light is formed on the photosensitive drum 142.

The electrostatic latent image of the photosensitive drum 142 is made visible as a developer image by a developer supplied from a developing device. Paper is fed from each of paper cassettes 143/144, a manual feeding unit, or a two-sided conveyance path 145 in timing synchronized with the irradiation start of laser light and the paper is conveyed to the photosensitive drum 142. The developer image formed on the photosensitive drum 142 is transferred to the paper. Then, the paper to which the developer image has been transferred is conveyed to a fixing unit 146, and the fixing unit 146 fixes the developer image on the paper by heating the paper under pressure. After passing through the fixing unit 146, the paper is discharged from the printer 140 toward the discharge unit 150.

If paper is discharged with its image formation surface downward (face down), the paper is temporarily led, after passing through the fixing unit 146, into an inversion path 147 by a switching operation of a flapper. After a rear end of the paper has passed through the flapper, the paper is discharged from the printer 140 by being switched back by a discharge roller. Hereinafter, this discharge form will be referred to as an inversion discharge. The inversion discharge is carried out when images are formed from the first page in order, for example, when images read by using the document feeding apparatus 121 are formed or when image data based on print data output from the PC 10, 11, or 12 is formed. As a result, the order of sheets of paper after being discharged is correct.

Further, when two-sided printing, which forms images on both sides of paper, is set, the paper is conveyed to the two-sided conveyance path 145 after being led to the inversion path 147 by a switching operation of the flapper. Control to feed the paper led to the two-sided conveyance path 145 to the photosensitive drum 142 again in the above timing is executed. In this manner, the paper discharged from the printer 140 is sent to the discharge unit 150.

In the discharge unit 150, the paper discharge destination control unit 152 performs discharge processing to a paper discharge destination (tray) based on control of the paper discharge control unit 151. The discharge unit 150 is divided into a total of six trays including the escape tray 157 and a plurality of lockable paper discharge trays 158-1 to 158-5. Each of the lockable paper discharge trays 158-1 to 158-5 is a lockable tray with a door. The lockable paper discharge trays 158-1 to 158-5 are generically denoted as the lockable paper discharge tray 158.

Paper sent from the printer 140 to the discharge unit 150 is set to one of the discharge units by the flapper being switched adjusting to the determined paper discharge destination from among six paper discharge destinations (trays) to select the pathway of the conveyance path.

The paper sent to the escape tray 157 or the lockable paper discharge tray 158 is successively stacked up in such a way that paper sent earlier is below paper sent later. When paper discharged to the lockable paper discharge trays 158-1 to 158-5 is to be picked up, it is usual to open the door by unlocking the lock control unit 153 of the lockable paper discharge tray 158 after the user who performs a door opening/closing operation is authenticated by an ID authentication unit 160. The lockable paper discharge trays 158-1 to 158-5 each have a paper detection unit 155 to detect a residual quantity of discharged paper arranged therein. Further, the door opening/closing control unit 154 detects the opening/closing state of the door in addition to performing opening/closing control of the door.

The paper discharge tray management unit 159 manages which of the lockable paper discharge trays 158 each user uses by outputting confidential documents thereto. The paper discharge tray management unit 159 manages the state of the lockable paper discharge tray 158. When the user transmits a confidential document to the lockable paper discharge tray 158, the paper discharge tray management unit 159 dynamically assigns the user ID to one of the lockable paper discharge trays 158-1 to 158-5 among the empty lockable paper discharge trays 158 by means of allocation.

An example in which the paper discharge tray management unit 159 dynamically assigns the lockable paper discharge tray 158 is shown in the present exemplary embodiment. However, the user may explicitly specify the lockable paper discharge tray 158, or the lockable paper discharge tray 158 may be determined for each user in advance.

FIGS. 3 and 4 are diagrams illustrating examples of a management table for paper discharge tray information managed by the paper discharge tray management unit 159 illustrated in FIG. 1. The present example illustrates an example of discharge unit information using lockable discharge units and an escape tray as the discharge units, but the management table for discharge unit information may manage only lockable paper discharge trays. Here, the discharge unit information contains the user name to identify the user whose usage status of the lockable discharge units are shown and the discharge unit name. FIG. 3 corresponds to the initial state in which no paper discharge tray is used and FIG. 4 illustrates the usage status of each paper discharge tray in a state in which job processing is in progress. FIG. 4 illustrates, for example, a state in which the user A discharges confidential documents to a plurality of lockable paper discharge trays (trays 1 and 4). Details of the table will be described with reference to FIGS. 6 and 7.

The management table managed by the paper discharge tray management unit 159 has a data structure illustrated in FIGS. 3 and 4. More specifically, the paper discharge tray management unit 159 manages, as discharge unit information, a paper discharge tray list, paper state of paper discharge trays, detection of maximum discharged paper stack, lock opening/closing, door state, user name, and use time. The management table is managed by being successively updated by the paper discharge tray management unit 159 adapting to the job execution state.

Figure 5:
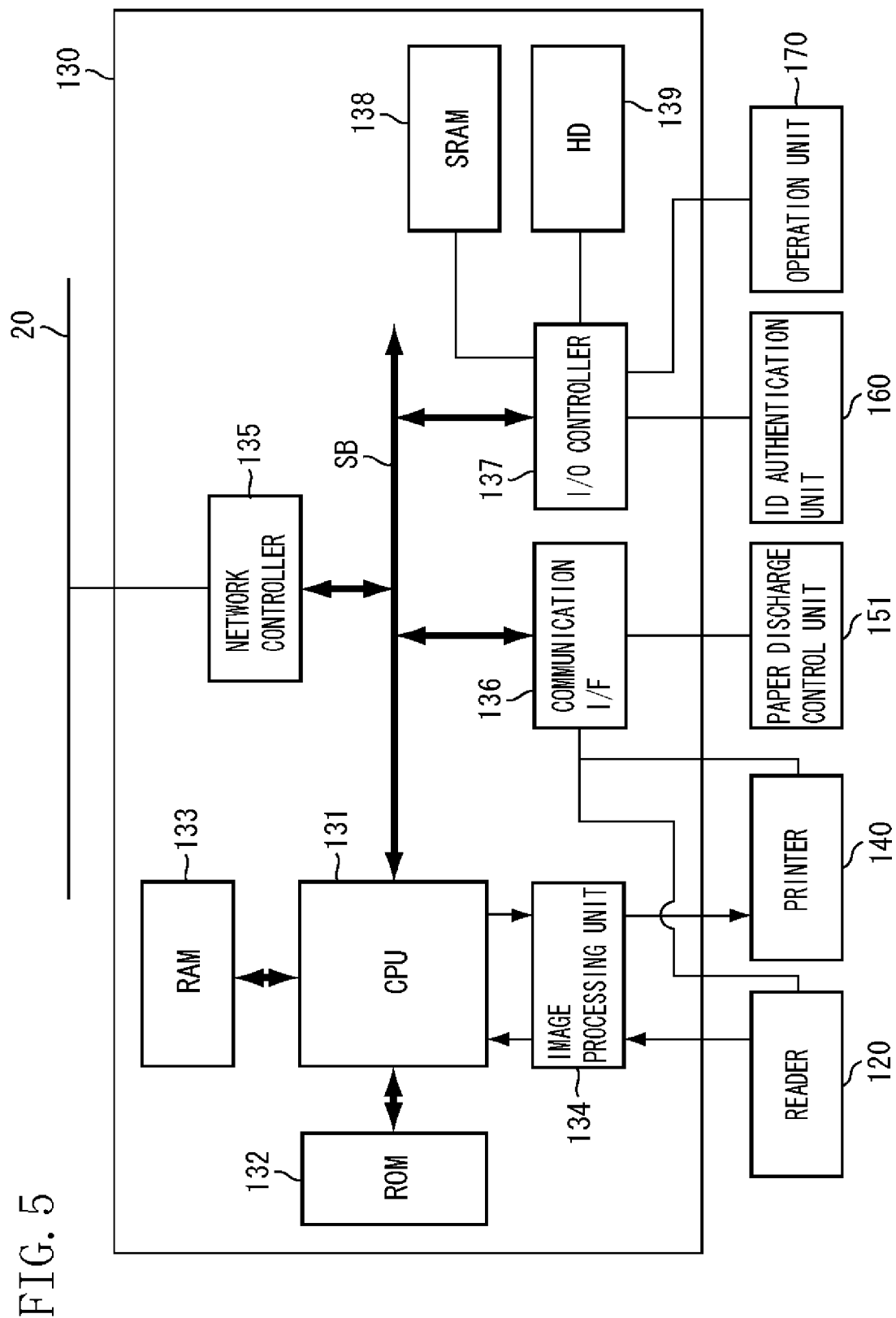
FIG. 5 is a block diagram illustrating the configuration of a controller.

FIG. 5 is a block diagram illustrating the configuration of the controller 130 illustrated in FIG. 1. In FIG. 5, a CPU 131 controls the whole image forming apparatus 100 and is a controller IC containing a CPU core and an image processing block. A random access memory (RAM) 133 is a system work memory for the CPU 131 to operate and also an image memory to temporarily store image data. A read-only memory (ROM) 132 is a boot ROM and stores a boot program to activate the system.

The CPU 131 is connected to a network controller 135, an I/O controller 137, and a communication interface 136 via a system bus SB, which is capable of transmitting/receiving communication data and image data at high speed.

The network controller 135 is connected to the LAN 20 and is a controller to transmit/receive data. The network controller 135 can flexibly perform communication with PCs or external apparatuses connected to the LAN 20 and input/output of image data and device information. Here, external apparatuses include other image forming apparatuses connected to the LAN 20.

The I/O controller 137 controls various I/O devices. The CPU 131 can control an HD 139, the ID authentication unit 160, and the operation unit 170.

A hard disk drive (HD) 139 stores system software, image data, system management data, and box management data. In the present exemplary embodiment, it is assumed that notification destination information is entered in the HD 139 by being associated with the user name. A static RAM (SRAM) 138 is a memory backed up by batteries and can retain various types of setting data for the controller 130.

The ID authentication unit 160 performs user authentication and can read information stored in a device such as an IC card. The read data is compared with user information stored in the HD 139 or user information of the job being executed and authorization of using the image forming apparatus 100, various settings, processing according to an execution job, or the like is performed depending on a result thereof. Incidentally, authentication can also be performed by face authentication using a camera (not illustrated) or other biometric authentication.

The operation unit 170 is a unit that makes various settings of an image forming apparatus. Communication data and display data are exchanged between the I/O controller 137 and the operation unit 170. Communication data is used to detect the key input via the operation unit 170 or the like and display data is used to be displayed in the display of the operation unit 170.

An image processing unit 134 is a block that performs various types of image processing, such as reduction and enlargement of an image and luminance-density conversion. The image processing unit 134 includes an image processing portion on input image data from the reader 120 and an image processing portion on output image data to the printer 140.

Image data read by the reader 120 is input into the CPU 131 via the image processing unit 134 before being temporarily stored in the RAM 133.

The CPU 131 internally has a block that performs compression, decompression, and rotation processing of an image and can perform various types of processing by accessing image data stored in the RAM 133. Image data on which compression processing has been performed by the CPU 131 is transferred to the HD 139 via the I/O controller 137 before being stored therein. An image stored in the HD 139 is read by the CPU 131, and after decompression processing is performed thereon, the printer 140 can form an image on paper.

Moreover, the CPU 131 can transmit the image to an external apparatus connected to the LAN 20 via the network controller 135.

The CPU 131 exchanges image data with the reader 120 and the printer 140 via the image processing unit 134 and performs communication processing via the communication interface 136. The communication interface 136 also performs communication with the paper discharge control unit 151 to give instructions concerning control of the discharge unit. Print data by the PC 10, 11, or 12 via the LAN 20 is input into the RAM 133 via the network controller 135 and the CPU 131. A raster image processor block (RIP) in the CPU 131 expands page description language (PDL) code of the received print data to a bitmap image on the RAM 133. The image data expanded on the RAM 133 is transferred to the printer 140, an image is formed on paper fed from the paper cassettes 143 or 144, and the paper is discharged to the assigned lockable paper discharge tray 158 if the image data requires authentication processing.

Data received via the network controller 135 can not only be printed but also be stored in the HD 139 or transferred to an external apparatus.

The printer 140 has a plurality of feeding stages so that different paper sizes or paper orientations and includes the corresponding paper cassettes 143 and 144. Paper on which an image is formed by the printer 140 is sent to the discharge unit 150 before being discharged to the lockable paper discharge tray 158 or the escape tray 157.

Next, a sequence of flow of message notification processing in an image forming apparatus applied to an exemplary embodiment of the present exemplary embodiment will be described with reference to flow charts in FIGS. 6 and 7.

Figure 6:
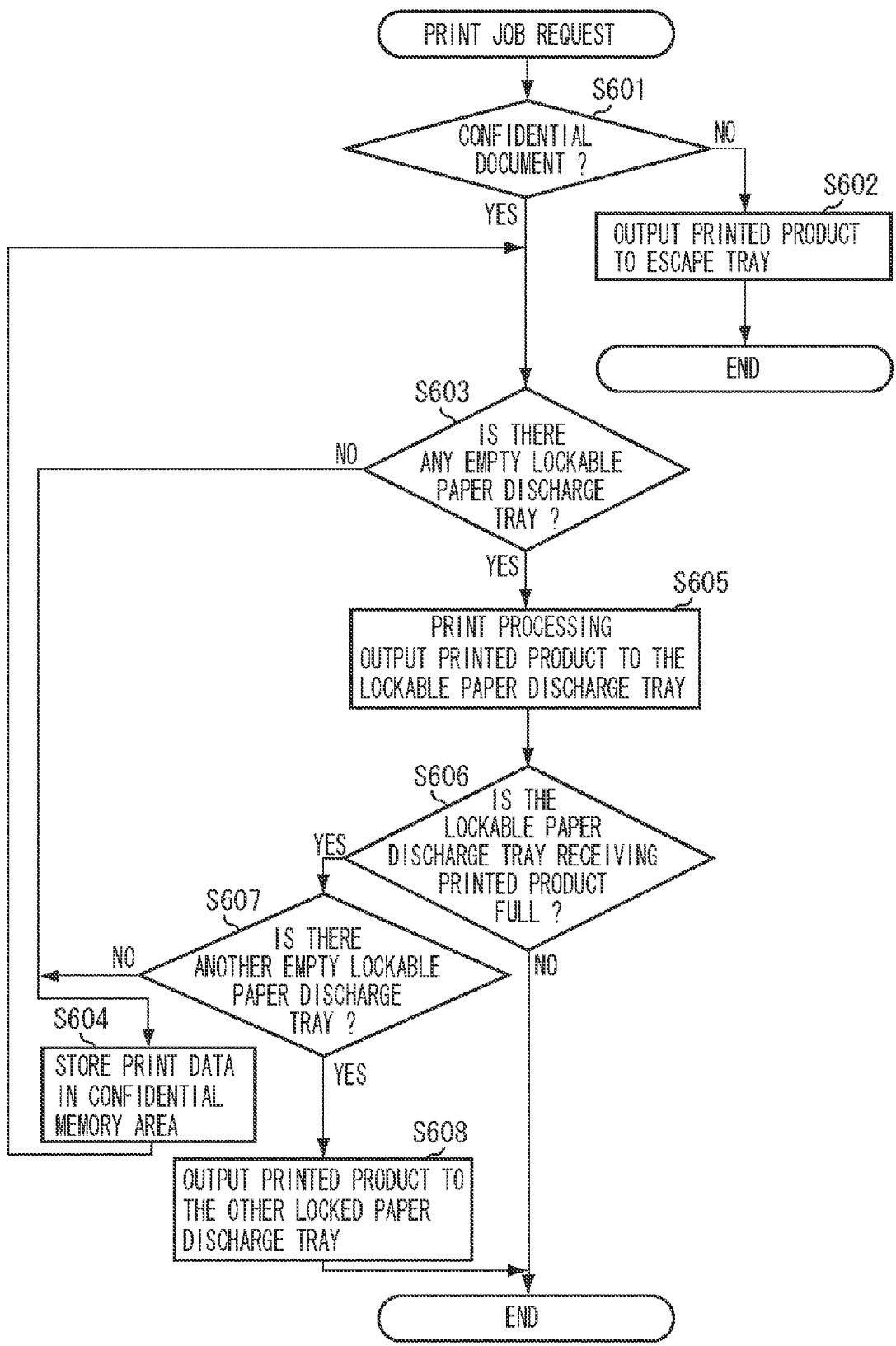
FIG. 6 is a flow chart illustrating a processing procedure for the image forming apparatus.

FIG. 6 is a flow chart from acceptance of a print job request from the PC 10, 11, or 12 by the image forming apparatus 100 to outputting of a printed product. Here, all the lockable paper discharge trays 158-1 to 158-5 are configured to be locked in an unused state by the lock control unit 153. Each step is carried out by a program stored in one of storage units of the RAM 133, the ROM 132, and the HD 139 being executed by the CPU 131. When the same user prints another job as a confidential document, the paper discharge control unit 151 executes control so that the confidential document is output to the same lockable discharge unit 158. Accordingly, printed products output to one lockable discharge unit 158 can be prevented from being viewed by other users. However, in the cases below, the same user uses more than one lockable discharge unit 158. Cases (1) to (3) below exemplify cases where the same user uses more than one lockable discharge unit 158.

(1) A case where the maximum number of stackable sheets in a paper discharge tray is reached while some printed product is being printed, and another paper discharge tray is then used to output the printed product. (2) A case where the user explicitly specifies the position of the lockable discharge unit. (3) A case where the output position of the lockable discharge unit is changed depending on the security level of a printed product. Here, an example in which the maximum number of stackable sheets in the predetermined lockable paper discharge tray 158 is reached and printed paper thereafter is output to the other lockable paper discharge tray 158 is shown.

When a print job is received from the PC 10, 11, or 12, the image forming apparatus 100 starts the present processing according to a request of the print job.

First, in step S601, the CPU 131 of the image forming apparatus 100 determines whether the print data received from the PC 10, 11, or 12 is a confidential document based on an attribute contained in the print data of the print job. The attribute indicating whether a confidential document is attached by a printer driver operating in an application used on the PC 10, 11, or 12 by the user. If the CPU 131 determines that the received data is not a confidential document, then in step S602, the CPU 131 instructs the paper discharge destination control unit 152 via the paper discharge control unit 151 to output the received data to the escape tray 157. Subsequently, a printed product is output to the escape tray 157 before the present processing is terminated.

On the other hand, if the CPU 131 determines that the print data is a confidential document in step S601, the CPU 131 sends an inquiry to the paper detection unit 155 and the paper discharge tray management unit 159 via the paper discharge control unit 151. Then, in step S603, the CPU 131 determines whether there is a tray in the lockable paper discharge tray 158 not in use based on a result of the inquiry. If the CPU 131 determines that there is no empty tray in the lockable paper discharge tray 158, then in step S604, the CPU 131 stores the confidential document in a confidential memory area (for example, the HD 139) before returning to step S603 because the confidential document cannot be printed and output as a printed product. In this case, the job stored in the HD 139 will be printed and output when one of the lockable paper discharge trays 158 becomes empty.

On the other hand, if the CPU 131 determines that there is an empty tray in the lockable paper discharge tray 158 in step S603, then in step S605, the CPU 131 performs print processing and outputs a printed product to the lockable paper discharge tray 158. Next, in step S606, the paper detection unit 155 checks whether the confidential document being output exceeds the maximum number of stackable sheets of the lockable paper discharge tray 158. If the paper detection unit 155 detects that the confidential document being output has exceeded the maximum number of stackable sheets of the lockable paper discharge tray 158, the processing proceeds to step S607.

Then, in step S607, the CPU 131 sends an inquiry about whether there is another lockable paper discharge tray 158 that is not in use to the paper detection unit 155 and the paper discharge tray management unit 159 via the paper discharge control unit 151. If the CPU 131 determines that there is not a lockable paper discharge tray 158 that is not in use in step S607, the CPU 131 stores the confidential document in the confidential memory area in step S604.

On the other hand, if the CPU 131 determines that there is another empty lockable paper discharge tray 158 in step S607, the processing proceeds to step S608. In step S608, the CPU 131 controls the paper discharge control unit 151 so that the confidential document output to the lockable paper discharge tray 158 after the maximum number of stackable sheets is reached is output to another lockable paper discharge tray. Then, the proceeding proceeds to processing illustrated in FIG. 7.

Thus, if the image forming apparatus 100 determines that the capacity of one lockable paper discharge tray is exceeded while data is being printed and output using the lockable paper discharge tray, the image forming apparatus 100 performs print processing of a confidential document using another lockable paper discharge tray. Accordingly, a state in which the same user occupies a plurality of lockable paper discharge trays may arise. Then, the user is entered in the table illustrated in FIG. 3 as a user who discharges a printed product to a plurality of lockable paper discharge trays.

Figure 7:
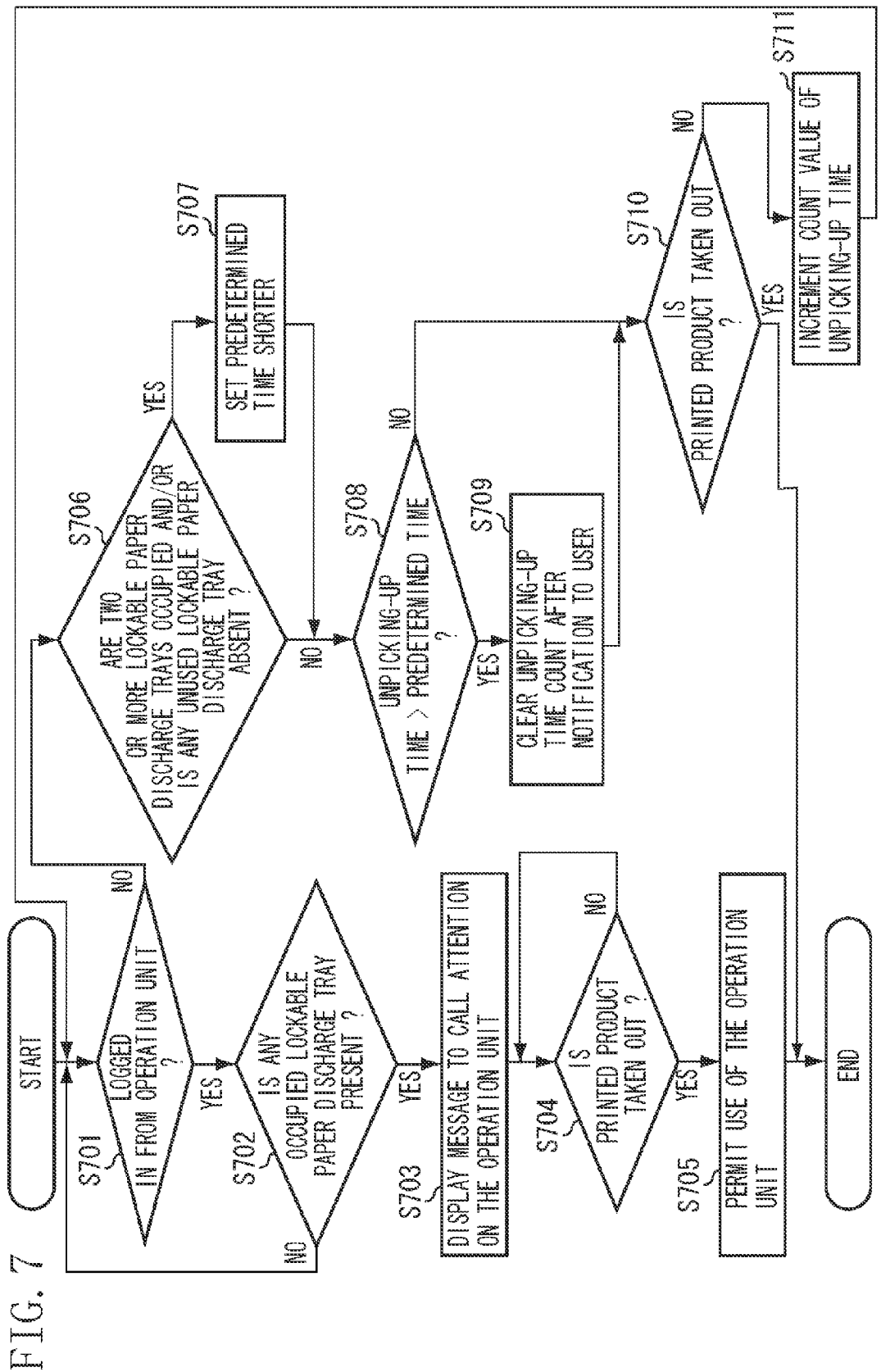
FIG. 7 is a flow chart illustrating the processing procedure for the image forming apparatus.

FIG. 7 is a flow chart illustrating processing until a message indicating that a confidential document remains unpicked up is notified after a printed product is output to the lockable paper discharge tray 158. Each step is carried out by a program stored in one of storage units of the RAM 133, the ROM 132, and the HD 139 being executed by the CPU 131.

In step S701, the user A inputs a password or performs biometric authentication and the CPU 131 determines whether to permit login based on matching with user information registered in advance via the ID authentication unit 160.

If login is permitted after successful user authentication in step S701, the CPU 131 of the image forming apparatus 101 proceeds to step S702 after referring to the management table of the paper discharge tray management unit illustrated in FIG. 4.

If login of the user A is permitted in step S702, the CPU 131 determines whether the lockable paper discharge tray 158 occupied by the user A is present. If the CPU 131 determines that the lockable paper discharge tray 158 occupied by the user A is not present in step S702, the CPU 131 returns to step S702. On the other hand, if the CPU 131 determines that the lockable paper discharge tray 158 used by the user A is present in step S702, the processing proceeds to step S703. In step S703, the CPU 131 causes the operation unit 170 to display a message thereon prompting picking up a confidential document retained in the lockable paper discharge tray 158 by using the user interface illustrated in FIGS. 8A and 8B. Then, the CPU 131 unlocks the lockable paper discharge tray 158.

FIGS. 8A and 8B are plan views illustrating the configuration of the operation unit 170 of the image forming apparatus 101 illustrated in FIG. 1.

FIG. 8A illustrates a screen for a user to log in to the image forming apparatus 101. The user A enters the user ID and the password for login into an ID entry field 171 and a password entry field 172, respectively. Subsequently, the user A presses an authentication key 173 to start authentication for login.

FIG. 8B illustrates an example in which a message prompting picking up the confidential document is displayed when the CPU 131 determines that the lockable paper discharge tray 158 occupied by the user A is present in step S702. This message is only an example and is not limited to this as long as the message contains a similar meaning.

Next, in step S704, the CPU 131 determines whether the user A has picked up the confidential document from the lockable paper discharge tray 158. If the CPU 131 determines that the user A has picked up the confidential document from the lockable paper discharge tray 158, the processing proceeds to step S705.

Then, in step S705, the CPU 131 permits use of the operation unit 170. Accordingly, the user A can perform an operation to perform the next print job on the operation unit 170. Then, the CPU 131 performs image processing set by the user A before the present processing is terminated. On the other hand, if user authentication is not successful or no login operation is performed in step S701, the processing proceeds to step S706.

In step S706, after referring to the management table of the paper discharge tray management unit 159 illustrated in FIG. 4, the CPU 131 determines whether there is any user who occupies two or more the lockable paper discharge tray 158 and/or the lockable paper discharge tray 158 that is not in use is absent. If the CPU 131 determines in the affirmative in step S706, the processing proceeds to step S707. If the CPU 131 determines in the negative, the processing proceeds to step S708. Then, in step S707, the CPU 131 sets the length of a predetermined time (length of the reference time) shorter. Then, the processing proceeds to step S708.

In step S708, after referring to the management table of the paper discharge tray management unit 159 illustrated in FIG. 4, the CPU 131 recognizes a time during which a confidential document remains unpicked up in the specific lockable paper discharge tray 158. Then, if the CPU 131 determines that the recognized time exceeds a predetermined time, then in step S708, the CPU 131 acquires a mail address of the user who has printed the confidential document upon receipt of a notification from the paper discharge control unit 151. Then, the CPU 131 transmits an e-mail prompting the user to pick up the confidential document from the lockable paper discharge tray 158 to the mail address. Then, the CPU 131 clears the count value of the time during which the confidential document uses the specific lockable paper discharge tray 158 in the management table of the paper discharge tray management unit 159. Then, the processing proceeds to step S710.

On the other hand, if the CPU 131 determines that the time during which the confidential document remains unpicked up in the specific lockable paper discharge tray 158 does not exceed the predetermined time, the processing proceeds to step S710. In step S710, the CPU 131 checks, through the paper detection unit 155, whether the printed product has been picked up. If the CPU 131 determines that the confidential document has been picked up, the CPU 131 terminates the present processing.

On the other hand, if the CPU 131 determines that no printed product has been picked up in step S704, the paper discharge tray management unit 159 counts up the count value of an unpicking-up time of the confidential document in step S705. Subsequently, the CPU 131 returns to step S701 again to repeat the sequence of processing. Therefore, if the user does not come to pick up the confidential document, the user is notified of a message prompting the user to pick up the confidential document as an e-mail at intervals of a predetermined period.

If a confidential document of a logged-in user is present in the lockable paper discharge tray 158, the operation unit 170 may be configured to prompt picking up the confidential document from the lockable paper discharge tray 158. Accordingly, a notification indicating that a printed product remains unpicked up in a lockable paper discharge tray can appropriately be made.

If the user A uses a plurality of lockable paper discharge trays 158 and/or all the other lockable paper discharge trays 158 are used and there is no empty lockable paper discharge tray, the time in which a message to call attention is notified is set shorter than before (the time period set as the initial value). In this manner, the method for notifying a message to the user who uses a plurality of lockable paper discharge trays is changed. In other words, the level of notification is raised.

As a result, the user A receives an e-mail to call attention more frequently, which increases a possibility that the user A will go to pick up the confidential document from the lockable paper discharge tray 158. With control executed as described above, the lockable paper discharge tray 158 can be used effectively.

Here, the configuration to prompt a user to pick up a printed product output to a lockable paper discharge tray by an e-mail is described, but the configuration is not limited to this. The user may be prompted to pick up the printed product output to the lockable paper discharge tray by communication with a PC executing a printer driver program.

According to the exemplary embodiment described above, a notification that a confidential document remains unpicked up in a lockable paper discharge tray can appropriately be made during printing using the lockable paper discharge tray.

Figure 9:
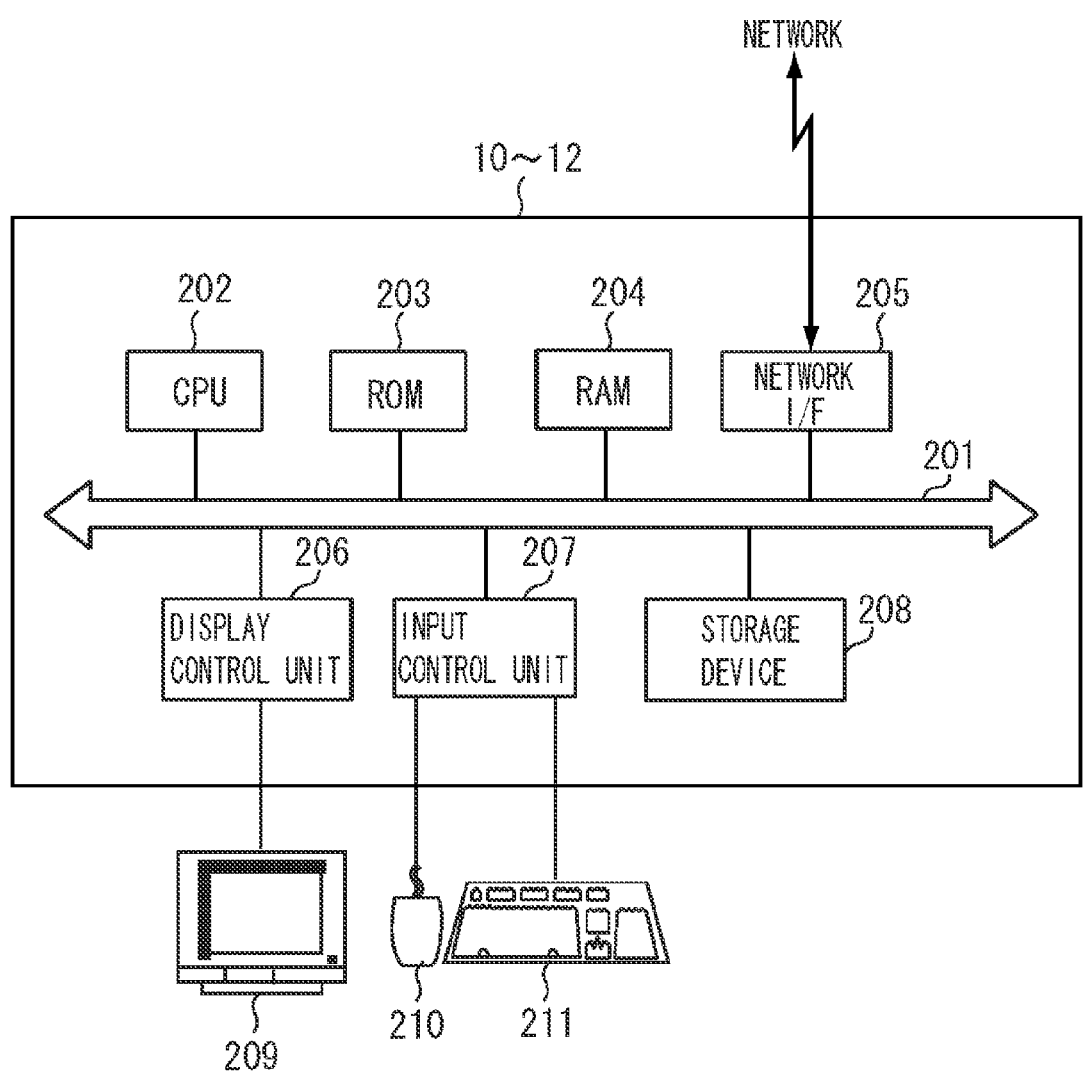
FIG. 9 is a block diagram illustrating a hardware configuration of a personal computer (PC).

Next, a case where a user transmits a print job from the PC 10, 11, or 12 illustrated in FIG. 1 to the image forming apparatus 100 will be described. FIG. 9 is a block diagram illustrating the hardware configuration of the PC 10, 11, or 12 illustrated in FIG. 1. In FIG. 9, a CPU 202 collectively controls devices connected to a system bus 201. A ROM 203 serving as a dedicated memory stores a boot program for system activation. A RAM 204 is a work memory usable by the CPU 202 for execution of a program.

A network interface 205 performs communication with an image forming apparatus in a network. A display control unit 206 executes display control to provide a display in a display apparatus 209. The user interface provided by the printer driver illustrated in FIGS. 10A and 10B is displayed in the display apparatus 209.

An input control unit 207 accepts input from input apparatuses 210 and 211. A storage device 208 stores information of software, such as an OS and applications, and a printer driver, which performs communication with an image forming apparatus to transmit print data. The storage device 208 includes a magnetic disk or the like.

Figure 10B:
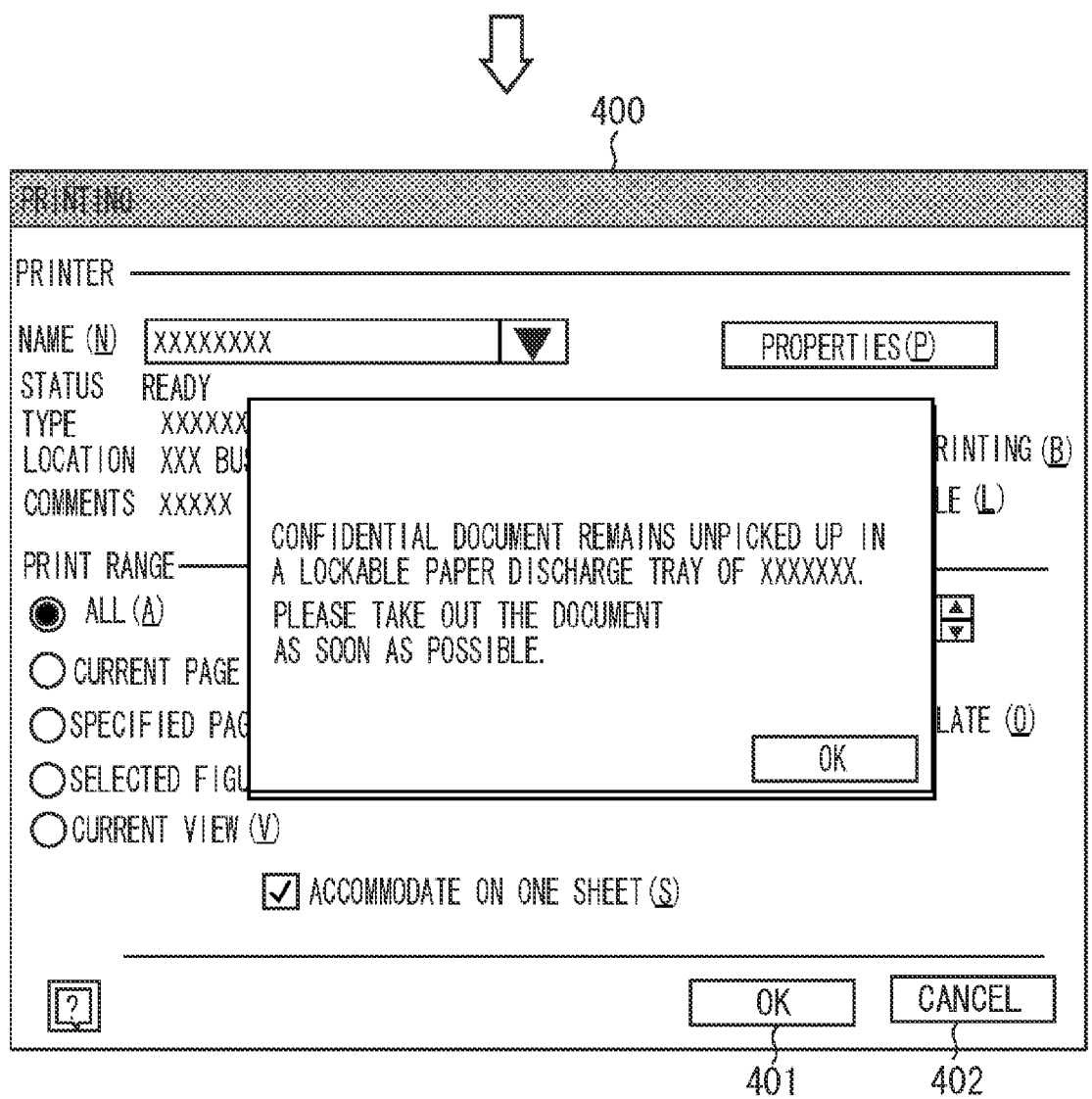

FIGS. 10A and 10B illustrate the user interface displayed in the display apparatus 209 of the PC 10, 11, or 12 illustrated in FIG. 9. The present example is a user interface provided by the printer driver stored in the storage device 208. FIG. 10A corresponds to a print setting screen 400 for instructing the start of printing. Confidential printing can be instructed by pressing an OK button 401. If confidential printing is instructed, the lockable paper discharge tray 158 of the image forming apparatus 100 is used. FIG. 10B illustrates a state in which a message indicating that a confidential document output by the user to the lockable paper discharge tray remains unpicked up is displayed on the print setting screen 400 in FIG. 10A. This message is only an example and is not limited to this as long as the message contains a similar meaning. The user of the PC where the present message is displayed and the user using the notified lockable paper discharge tray are the same user. The user can close the print setting screen 400 by pressing a cancel button 402.

FIG. 11 is a flow chart illustrating an example of the data processing procedure for an information processing apparatus according to the present exemplary embodiment. The present example is an example in which a new print job is further transmitted while the lockable paper discharge tray 158 is used. Each step is carried out by a program stored in one of storage units of the ROM 203 and the storage device 208 being loaded into the RAM 204 and executed by the CPU 202. The flow until printout by the image forming apparatus 100 from which the print job is requested is similar to that in FIG. 6. The flow chart until a message that a confidential document remains unpicked up is notified after a printed product is output to the lockable paper discharge tray 158 is similar to that in FIG. 7.

First, in step S800, the CPU 202 recognizes that the user A is about to transmit a print job from user information on the PC 10 by executing the printer driver program. Here, the CPU 202 determines whether there is any print job to be transmitted to the image forming apparatus 100 based on whether the print setting screen provided by the printer drive is open. If the CPU 202 determines that there is a print job to be transmitted, the processing proceeds to step S801.

Next, in step S801, the CPU 202 requests acquisition of the management table illustrated in FIG. 4 from the image forming apparatus 100. Next, in step S802, the CPU 202 executing the printer driver program examines the management table acquired from the image forming apparatus 100 to perform the following checking: whether the user A uses a plurality of lockable paper discharge tray 158 and/or the lockable paper discharge tray 158 that is not in use is absent. If the CPU 202 determines in the negative, the processing proceeds to step S806.

On the other hand, if the CPU 202 determines in the affirmative in step S802, then in step S803, the CPU 202 displays, as illustrated in FIG. 10B, a message prompting the user A to pick up the confidential document as a popup window on the print setting screen. The timing of displaying the message illustrated in FIG. 10B may be immediately after startup of the printer driver or the OK button 401 is pressed to transmit a print job.

Then, in step S804, the CPU 202 examines the management table of the image forming apparatus 100 to check whether the confidential document has been picked up of the lockable paper discharge tray 158. After checking the above message, the user A is assumed to move to the image forming apparatus 100 to pick up the printed and stored confidential document (printed product) from the lockable paper discharge tray 158.

If the CPU 202 determines that the confidential document (printed product) has not been picked up of the lockable paper discharge tray 158, the CPU 202 repeats step S804 without accepting any transmission request of a print job from the PC 10. More specifically, the CPU 202 limits acceptance of transmission requests of a print job from the PC 10. If the CPU 202 determines that the confidential document (printed product) has been picked up of the lockable paper discharge tray 158, the display of the message illustrated in FIG. 10B is closed. Then, the processing proceeds to step S805.

In step S805, the CPU 202 transmits print data to the image forming apparatus 100 by permitting transmission of a new print job before terminating the present processing.

On the other hand, if the CPU 202 determines in the negative in step S802, the processing proceeds to step S806. In step S806, the CPU 202 determines whether there is any lockable paper discharge tray occupied by the user A. If the CPU 202 determines that there is a lockable paper discharge tray occupied by the user A, the processing proceeds to step S807. In step S807, the CPU 202 provides a display similar to that in step S803. Here, there is only one occupied paper discharge tray and, therefore, the CPU 202 terminates the present processing by performing processing in step S805 without performing processing in step S804. If the CPU 202 determines that there is no lockable paper discharge tray occupied by the user A in step S806, the CPU 202 similarly performs processing in step S805. Then, the processing ends.

On the image forming apparatus 100 side, on the other hand, the image forming apparatus 100, which has received print data from the PC 10, executes a print job according to processing illustrated in FIG. 6. An example in which the CPU 202 requests acquisition of the management table illustrated in FIG. 4 from the image forming apparatus 100 in step S801 has been described. When the CPU 202 activates the printer driver, the CPU 202 may determine whether the image forming apparatus 100 in FIG. 7 has received a message notified in step S709. If the image forming apparatus 100 has received the message, the CPU 202 may perform processing in step S803.

Particularly when the same user occupies a plurality of lockable paper discharge trays 158 and/or there is no lockable paper discharge tray not in use, as described above, transmission of a new print job is not permitted until a confidential document is picked up. Accordingly, the user can be made to pick up the confidential document.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-115553 filed May 12, 2009, which is hereby incorporated by reference herein in its entirety.

What is claimed is:

1. An apparatus for discharging a printed product to one of a plurality of discharge units, the apparatus comprising:
   a storing unit configured to store information indicating a discharge unit to which the printed product is discharged and information indicating a user;
   a notification unit configured to prompt the user to pick up the printed product discharged to the discharge unit based on the stored information; and
   a determination unit configured to determine, based on the stored information, whether a user is using one discharge unit or the plurality of discharge units,
   wherein, in a case where the determination unit determines that the user is using one discharge unit, the notification unit prompts the user each time a first interval elapses, and
   wherein, in a case where the determination unit determines that the user is using the plurality of discharge units, the notification unit prompts the user each time a second interval which is shorter than the first interval elapses.

2. The apparatus according to claim 1, wherein the storing unit further stores information indicating whether each of the plurality of discharge units is being used,
   wherein the determination unit further determines whether there is a discharge unit not in use based on the stored information, and
   wherein, in a case where the determination unit determines that there is no discharge unit not in use, the notification unit prompts the user each time the second interval shorter than the first interval elapses.

3. The apparatus according to claim 1, further comprising:
   a counting unit configured to count a time during which the printed product is present in the discharge unit after the printed product is output to the discharge unit,
   wherein, in a case where the time counted by the counting unit reaches a predetermined time, the notification prompts the user.

4. The apparatus according to claim 3, wherein, in a case where the user is using the plurality of discharge units, the counting unit sets the predetermined time shorter.

5. The apparatus according to claim 3, wherein, in a case where there is no discharge unit not in use, the counting unit sets the predetermined time shorter.

6. A method for controlling an apparatus for discharging a printed product to one of a plurality of discharge units, the method comprising:
   storing information indicating a discharge unit to which the printed product is discharged and information indicating a user;
   prompting the user to pick up the printed product discharged to the discharge unit based on the stored information; and
   determining, based on the stored information, whether a user is using one discharge unit or the plurality of discharge units,
   wherein, in a case where it is determined that the user is using one discharge unit, the user is notified each time a first interval elapses, and
   wherein, in a case where it is determined that the user is using the plurality of discharge units, the user is notified each time a second interval which is shorter than the first interval elapses.

7. The method according to claim 6, further comprising storing information indicating whether each of the plurality of discharge units is being used;
   determining whether there is a discharge unit not in use based on the stored information; and
   prompting the user to pick up the printed product each time the second interval shorter than the first interval elapses in a case where it is determined that there is no discharge unit not in use.

8. The method according to claim 6, further comprising:
   counting a time during which the printed product is present in the discharge unit after the printed product is output to the discharge unit; and
   prompting the user to pick up the printed product in a case where the counted time reaches a predetermined time.

9. The method according to claim 8, further comprising setting the predetermined time shorter in a case where the user is using the plurality of discharge units.

10. The method according to claim 8, further comprising setting the predetermined time shorter in a case where there is no discharge unit not in use.

11. A non-transitory computer-readable storage medium storing a computer program for controlling an apparatus for discharging a printed product to one of a plurality of discharge units, the computer program comprising:
    a code to store information indicating a discharge unit to which the printed product is discharged in and information indicating a user;
    a code to prompt the user to pick up the printed product discharged to the discharge unit based on the stored information; and
    a code to determine, based on the stored information, whether a user is using one discharge unit or the plurality of discharge units,
    wherein, in a case where it is determined that the user is using one discharge unit, the user is notified each time a first interval elapses, and wherein, in a case where it is determined that the user is using the plurality of discharge units, the user is notified each time a second interval which is shorter than the first interval elapses.

12. The non-transitory computer-readable storage medium according to claim 11, further comprising a code to store information indicating whether each of the plurality of discharge units is being used;
   a code to determine whether there is a discharge unit not in use based on the stored information; and
   a code prompt the user to pick up the printed product each time the second interval shorter than the first interval elapses in a case where it is determined that there is no discharge unit not in use.

13. The non-transitory computer-readable storage medium according to claim 11 further comprising:
   a code to count a time during which the printed product is present in the discharge unit after the printed product is output to the discharge unit; and
   a code prompt the user to pick up the printed product in a case where the counted time reaches a predetermined time.

14. The non-transitory computer-readable storage medium according to claim 13, further comprising a code to set the predetermined time shorter in a case where the user is using the plurality of discharge units.

15. The non-transitory computer-readable storage medium according to claim 11, further comprising a code to set the predetermined time shorter in a case where there is no discharge unit not in use.

* * * * *